METHOD AND APPARATUS FOR ANALYZING AN IMPURITY GAS OF LOWER IONIZATION POTENTIAL THAN ITS CARRIER GAS

Filed Dec. 26, 1963

FIGURE 3 $$I_{12+} = A\int_{0}^{v_i/2f} q\,dx$$

FIGURE 4 $$I_{12-} = A\int_{0}^{v_e/2f} q\,dx$$

FIGURE 5 $$I_{14+} = A\int_{v_i/2f}^{d} q\,dx$$

FIGURE 6 $$I_{14-} = A\int_{v_e/2f}^{d} q\,dx$$

INVENTOR.
ROBERT K. CURRAN
ARTHUR I. COLEMAN
BY
Ronald B. Sherer 3,358,140

METHOD AND APPARATUS FOR ANALYZING AN IMPURITY GAS OF LOWER IONIZATION POTENTIAL THAN ITS CARRIER GAS

Robert K. Curran, Allentown, and Arthur I. Coleman, Philadelphia, Pa., assignors to Air Products and Chemicals, Inc., a corporation of Delaware Filed Dec. 26, 1963, Ser. No. 333,511
5 Claims. (Cl. 250—43.5)

The present invention relates to a method and apparatus for detecting and/or measuring trace amounts of impurities in the gaseous or vapor state and, more particularly, the present invention relates to a gaseous impurity detector which operates in response to variations in the mobility of ions.

The ever-increasing need for gases approaching absolute purity has carried with it an increasing need for analyzers and detectors having greater sensitivity as well as responsiveness to wider ranges of various gas mixtures. That is, the detectors must not only measure progressively decreasing amounts of impurity traces in carrier gases, but they must be capable of detecting a wider variety of different impurities in different carrier gases.

In the past, and particularly in the field of gas chromatography, at least nine different types of detectors have been employed, each having different advantages and disadvantages. For example, previously proposed Cross Section Ionization Detectors can be used with a wide range of different gas mixtures, however, their relatively low sensitivities render them unsuitable for many applications in gas chromatography. Flame Ionization Detectors also possess many advantages, however changes in geometry, flow rate, and gas compositions alter the relative response characteristics with different gas mixtures. Thus, their results are not sufficiently predictable for many applications. The so-called "Argon Metastable Detectors" require excitation of the gas to a metastable state and are therefore limited to use with argon or helium since other rare gases are not economically feasible. In addition, these detectors are not usable with the fixed gases. The remaining types of detectors include Electron Capture Detectors, Electron Mobility Detectors, Glow Discharge Detectors, R.F. Corona Discharge Detectors, Electron Impact Detectors, and Photoionization Detectors, all of which possess distinct advantages and disadvantages as more fully described in a comprehensive article by J. E. Lovelock in Volume 33, Number 2 of Analytical Chemistry, February 1961.

The present invention departs from the above-indicated types of detectors in that a different principle of operation has been discovered which is based upon variations in ion mobility. Furthermore, the present invention provides a new mode of operation wherein alternating voltage signals of predetermined frequency are applied so that substantially all electron and ion currents are balanced in the detector. A subsequent increase of ion current thereby becomes highly sensitive to an indicative of impurity content.

It is therefore a principal object of the present invention to provide a new type of gas detector having increased sensitivity over a greater variety of gaseous atomic and molecular species.

This principal object, as well as other objects relating more particularly to specific advantages of construction and operation, will become more fully apparent from the following description when taken with the accompanying drawings, in which:

FIGURES 3 through 6 set forth the first approximation equations governing the currents resulting from the collection of charged particles at the electrodes.

Figure 1:
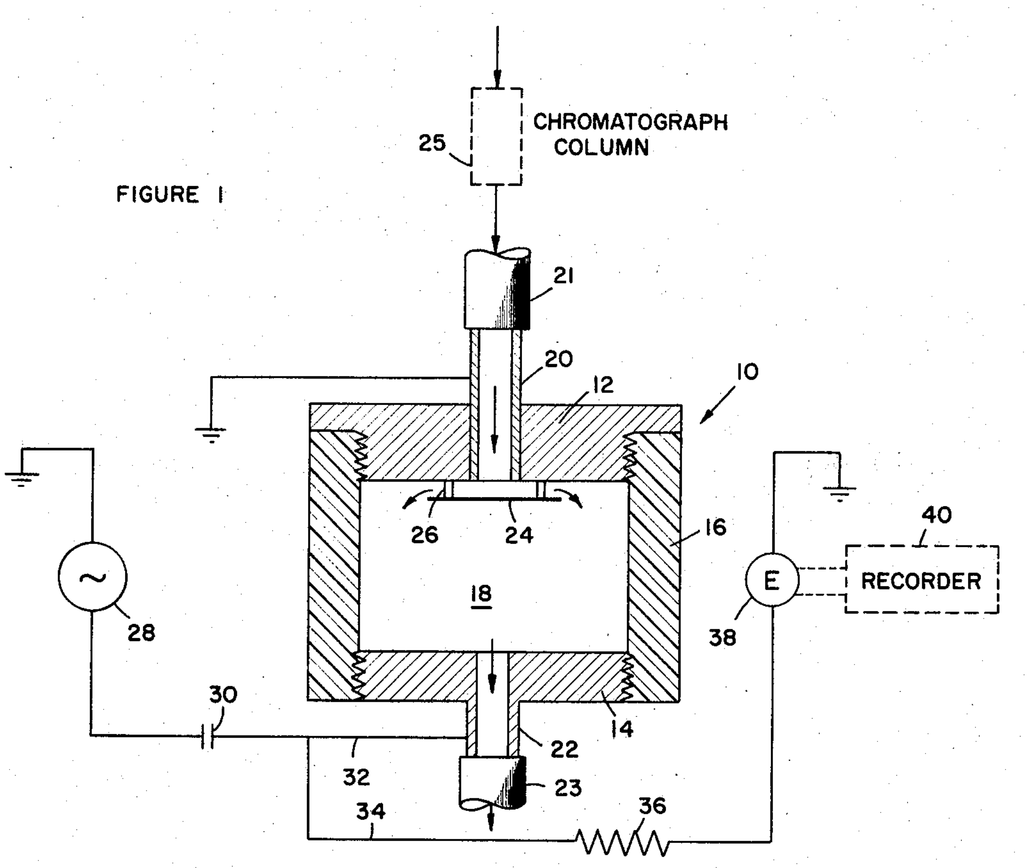
FIGURE 1 is a schematic diagram of the essential components forming the complete detector system.

Referring first to FIGURE 1, numeral 10 generally designates the detector which includes a pair of electrodes 12 and 14 threaded into opposite ends of an annular, insulating cylinder 16 the latter of which is preferably composed of glass or plastic such as polyfluoroethylene. Electrodes 12 and 14 are preferably composed of stainless steel or brass having their inner surfaces gold-plated, however, other materials may be employed so long as they do not tend to outgas impurities into the detector chamber 18. Electrodes 12 and 14 are formed with respective inlet and outlet conduits 20 and 22 through which the gas is supplied to and exhausted from chamber 18. Conduits 20 and 22 are composed of conductive material but these conduits are connected to non-conductive tubes 21 and 23 so as to electrically isolate the detector from surrounding equipment. In some applications, this equipment may include a gas chromatograph column 25 but the detector is in no way limited to use therewith.

A radioactive source 24 is mounted within chamber 18 closely adjacent electrode 12. This source of beta particles is preferably composed of a layer of tritium occluded in titanium supported by a thin stainless steel disc which, in turn, is supported by a plurality of electrically-conductive legs 26. In practice, the disc is spaced approximately one millimeter from the inner surface of electrode 12, whereas, the source is spaced approximately one centimeter from electrode 14. In the preferred embodiment, the strength of the source is in the order of fifty millicuries.

At this point, it is to be understood that the average penetration of the beta particles emitted from source 24 is also in the order of one centimeter as is the internal diameter of cylinder 16 so that all portions of chamber 18 between the source and electrode 14 are subjected to the ionizing effect of the source. Thus, gas introduced through inlet conduit 20 flows around the edges of the source, fills chamber 18 and is partially ionized by the source.

Detector 10 is connected in the circuit shown in FIGURE 1 which includes a conventional, alternating voltage source 28 having suitable amplifier stages contained therein. Although the electrical connections to the electrodes 12 and 14 may be made in a reverse manner, electrode 12 is shown as the grounded electrode in the illustrated embodiment.

The output of the generator is supplied through capacitor 30 and line 32 to electrode 14. The circuit also includes a grounded electrometer 38 connected through lines 32, 34 and resistance 36 to electrode 14. Optionally, a conventional stylus or pen-type recorder 40 may be added for the purpose of providing a permanent record of the detector output.

*Operation*

The operation of the system will best be understood by first considering the process of ionization when an applied voltage is not impressed across electrodes 12 and 14. This process includes the continuous emission of beta particles from source 24 so that a very large number of free electrons and ions are produced relative to the number of beta particles. For example, one beta particle generally produces several hundred electron-ion pairs so that the number of beta particles is insignificant and the electrical contribution thereof to the total collected current may be dropped from further consideration. Of course, cations and/or anions may be produced depending upon the particular gaseous mixture.

Figure 2:
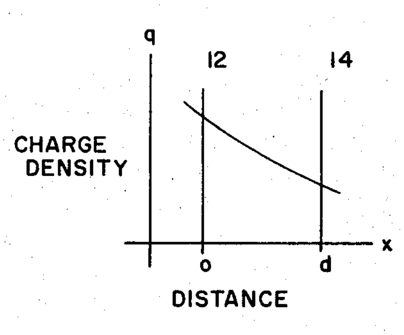
FIGURE 2 illustrates the particle charge density as a function of the distance between the detector electrodes.

Throughout the continuous ionization, the space distribution of the electrons and the ions is unequal due to the fact that the beta particles are attenuated exponentially with distance from source 24 which is closely adjacent electrode 12. Thus, as shown in FIGURE 2, there is a decreasing gradient in the charge density $q$ along the direction $x$ from electrode 12 to electrode 14; the electrodes being separated by a distance $d$. This unequal distribution of charged particles would normally result in unequal numbers of particles being collected at the electrodes upon the application of an applied voltage across the electrodes. However, the present invention substantially eliminates such undesirable background noise by the application of an alternating voltage of a predetermined frequency. The effect of this applied signal is best understood from consideration of the first approximation equations as set forth in FIGURES 3 through 6. The FIGURE 3 equation quantitatively describes the current $I_{12}^+$ which is composed of the ions collected at electrode 12; positive ions being assumed for purposes of example. Thus, this equation indicates that the current will be equal to the cross sectional area A of the detector multiplied by the integral of the charge density $q$ of the cations times $dx$ between the limits of O and $v_i/2f$ where $v_i$ is the velocity of the ions and $f$ is the frequency of the applied signal. Similarly, the equation set forth in FIGURE 4 describes the current $I_{12}^-$ which is composed of the electrons collected at electrode 12 while the equation in FIGURE 5 describes the current $I_{14}^+$ which is composed of the cations collected at electrode 14. Lastly, the equation in FIGURE 6 describes the current $I_{14}^-$ which is composed of the electrons collected at electrode 14.

In all of these equations, $v_i$ is the velocity of ions, whereas, $v_e$ is the velocity of electrons and it will be apparent that, for a given gas, there will be characteristic ion and electron velocities such that the positive and negative portions of the cycle will approach a balanced current condition at some particular frequency. For example, with pure argon in chamber 18, the collected currents will be substantially balanced at an applied voltage frequency of approximately 100 kc. Similarly, with pure hydrogen, pure helium, or pure nitrogen in the detector, balanced currents can be obtained at similar frequencies of the same order. Thus, the current in the detector may be substantially balanced with a pure carrier gas in the chamber by setting the frequency of the applied signal such that substantially no current is observed on the electrometer. Of course, this balance presupposes an initial calibration wherein the electrodes are properly spaced from each other and the gas flow rate is fixed at some convenient value such as 1.5 c.f.h. In addition, it is to be understood that the amplitude of the applied voltage signal is approximately 150 volts peak-to-peak at the detector annode.

With a pure carrier gas in the detector and an applied voltage across the electrodes, the ions are accelerated whereby numerous collisions occur between the carrier ions and the carrier atoms. Under these conditions, the probability of inelastic collisions is obviously very high since no energy input is required; all of the atoms having the same ionization potential. Therefore, the ion mobility is relatively low under these conditions since each ion produced by an inelastic collision has substantially zero velocity immediately after the collision. Each of the resultant ions are then accelerated by the electric field and further inelastic collisions occur wherein new ions are produced. Again, these start from substantially zero velocity toward one of the electrodes. As a result of these many inelastic collisions, there is a relatively low value of ion mobility with pure gas in the detector.

Now, let it be assumed that an impurity gas is introduced wherein the ionization potential of the impurity gas is less than that of the carrier gas. Under these conditions, the collision of an impurity ion and a carrier atom produces an elastic collision wherein the excess electron charge is not transferred from the atom to the ion. Thus, substantially all of the original velocity of the ion is retained and it does not start from a zero velocity as in an inelastic collision. As a result, the ion mobility of the gas mixture is substantially increased. An increased current is thereby collected at the electrodes and this is detected by the electrometer. Since the number of elastic collisions is directly proportional to the amount of impurity which is present, the current increase is a direct measure of the impurity content. Of course, it must be noted that this direct proportionality is true only so long as the value of the impurity is small relative to the total number of atoms per unit volume. For example, this proportionality becomes non-linear to an objectionable extent if the number of impurity atoms becomes greater than one tenth of the total atoms per unit volume.

From the foregoing description it will be apparent that the detector is not limited to gases having ionization potentials lower than the metastable states of the carrier gas, but rather, it is applicable to all gases, vapors, and mixtures thereof so long as the impurity has a lower ionization potential than that of the carrier. By way of example, any of the following gases may be detected in any of those succeeding it although it is to be understood that this list is by no means exclusive or exhaustive: $C_6H_6$, NO, $C_2H_4$, $NH_3$, $C_3H_8$, $C_2H_6$, $Xe_2$, $O_2$, $NO_2$, $H_2O$, $N_2O$, $CH_4$, $CO_2$, Kr, CO, $N_2$, $H_2$, A, $Ne_2$, He.

With regard to sensitivity, the present system has been found to be capable of detecting a change of one part in one million without a chromatograph column and this represents a substantial increase in sensitivity over any other type of known detector which is capable of detecting the fixed gases as well as the so-called non-fixed gases, the latter of which decompose or are oxidized in atmosphere.

In the foregoing description it was assumed that there was only one impurity gas in the carrier gas. However, several impurity gases may be detected if the impurity mixture is first separated into its component gases by passage through a conventional chromatograph column such as shown at 25. Thus, the present detector may be used alone to detect a component of a binary gas mixture, or, it may be used with a chromatograph column to detect the components of a ternary or higher multiple gas mixture. In addition, it will be readily apparent that a pair of detectors may be operated simultaneously so that one operates on pure carrier gas as a reference signal while the other operates on the impurity sample. In this instance, the output signals of the detectors can be fed to a differential amplifier wherein the difference is a measure of the impurity level.

As used hereinabove and in the following claims, the term "carrier" gas is intended to include any fluid in the gaseous or vapor state which forms a first component of gaseous mixture, and the term "impurity" gas is intended to include any fluid in the gaseous or vapor state which forms a second component of the gaseous mixture whether or not the gaseous mixture is subjected to gas chromatography procedures in connection with the analysis thereof.

Obviously, many other modifications and variations of the invention as hereinbefore set forth may be made without departing from the spirit and scope thereof, and therefore only such limitations should be imposed as are indicated in the appended claims.

What is claimed is:

1. The method of analyzing the impurity content of a gaseous mixture including a carrier gas and an impurity gas wherein the ionization potential of the impurity gas is lower than that of the carrier gas comprising the steps of:

(1) partially ionizing said mixture to form free electrons, carrier ions, and impurity ions, (2) forming a nonuniform charge density distribution of said electrons and ions across a space between first and second electrodes connected in circuit, (3) applying an alternating voltage signal to said electrodes such that said carrier ions undergo charge-transferring inelastic collisions while said impurity ions undergo noncharge-transferring elastic collisions, (4) setting the voltage and frequency of said signal and the spacing of said electrodes to predetermined values, said predetermined values being such that, with a pure carrier gas in said space, a current of a first magnitude is detected in said electrode circuit, and (5) detecting the change in said detected current which results from and is proportional to the number of said impurity ions undergoing noncharge-transferring elastic collisions in said mixture.

2. The method as claimed in claim 1 wherein the partially ionizing step includes bombardment of said mixture by particles from a radioactive source such that attenuation of the particles produces said nonuniform distribution of charge density.

3. The method as claimed in claim 1 wherein said mixture is first passed through a gas chromatograph column.

4. The method as claimed in claim 1 further including the initial steps of partially ionizing pure carrier gas in the space between said electrodes to form a nonuniform charge density distribution of carrier ions and electrons across said space, varying the frequency and voltage of said alternating voltage signal and the electrode spacing, and determining said predetermined values.

5. Apparatus for analyzing the impurity content of a gaseous mixture including a carrier gas and an impurity gas wherein the ionization potential of the impurity gas is lower than that of the carrier gas comprising:

(1) means for partially ionizing said mixture to form free electrons, carrier ions, and impurity ions, (2) means for forming a nonuniform charge density distribution of said electrons and ions across a space between first and second electrodes connected in circuit, (3) means for applying an alternating voltage signal to said electrodes such that said carrier ions undergo charge-transferring inelastic collisions while said impurity ions undergo noncharge-transferring elastic collisions, (4) means for setting the voltage and frequency of said signal and means for setting the spacing of said electrodes to predetermined values, said predetermined values being such that, with a pure carrier gas in said space, a current of a first magnitude is detected in said electrode circuit, and (5) means for detecting the change in said detected current which results from and is proportional to the number of said impurity ions undergoing noncharge-transferring elastic collisions in said mixture.

References Cited

UNITED STATES PATENTS

| | | | |
|---|---|---|---|
| 2,761,976 | 9/1956 | Obermaier et al. ---- | 250—43.5 |
| 2,950,387 | 8/1960 | Brubaker --------- | 250—41.9 |
| 3,154,680 | 10/1964 | Greene ---------- | 250—83.6 X |
| 3,171,028 | 2/1965 | Lovelock ---------- | 250—83.6 |
| 3,185,845 | 5/1965 | Lively et al. -------- | 250—83.6 |

ARCHIE R. BORCHELT, *Primary Examiner.*

RALPH G. NILSON, *Examiner.*

S. ELBAUM, *Assistant Examiner.*